(12) United States Patent
Fiedler

(10) Patent No.: US 8,826,040 B2
(45) Date of Patent: Sep. 2, 2014

(54) PRODUCT SECURITY SYSTEM

(75) Inventor: Michael Fiedler, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 518 days.

(21) Appl. No.: 13/002,216

(22) PCT Filed: Jul. 22, 2009

(86) PCT No.: PCT/EP2009/005323
§ 371 (c)(1),
(2), (4) Date: Dec. 30, 2010

(87) PCT Pub. No.: WO2010/009876
PCT Pub. Date: Jan. 28, 2010

(65) Prior Publication Data
US 2011/0138193 A1    Jun. 9, 2011

(30) Foreign Application Priority Data

Jul. 23, 2008  (DE) .......................... 10 2008 034 328

(51) Int. Cl.
| | |
|---|---|
| *H04L 9/12* | (2006.01) |
| *G06F 21/60* | (2013.01) |
| *G06F 21/10* | (2013.01) |
| *H04L 9/32* | (2006.01) |

(52) U.S. Cl.
CPC ............. *H04L 9/32* (2013.01); *H04L 2209/805* (2013.01); *G06F 21/10* (2013.01); *H04L 2209/80* (2013.01)
USPC .......................................... 713/193; 713/189

(58) Field of Classification Search
CPC ................ G06F 21/60; H04L 2209/80; H04L 2209/805; H04L 9/0618; H04L 9/0637; H04L 9/12
USPC .................................................... 713/189, 193
See application file for complete search history.

(56) References Cited

U.S. PATENT DOCUMENTS 6,357,010 B1 *  3/2002  Viets et al. .................... 726/4
7,117,373 B1 * 10/2006  Trimberger et al. .......... 713/193

(Continued)

FOREIGN PATENT DOCUMENTS

WO   2008/022123 A2   2/2008

OTHER PUBLICATIONS

International Search Report in PCT/EP2009/005323, Dec. 4, 2009.

*Primary Examiner* — Jung Kim
*Assistant Examiner* — Ngoc D Nguyen
(74) *Attorney, Agent, or Firm* — Workman Nydegger

(57) ABSTRACT

The present invention relates to a product information system and a corresponding method in a product information system with products 2, to which there are applied machine-readable items of information 14. A data service 5 for data 16 allocated to the products is furnished. The machine-readable item of information 14 applied to a product 2 are read by a data requester 4. The data allocated to the product are requested through sending the read machine-readable data to the data service 5, the data request 15 is received by the data service 5, the requested data 16 are determined by the data service 5 and sent by the data service 5 to the data requester 4. In the step of determining the requested data 16, the data are generated by decrypting encrypted data 11-13 using the machine-readable items of information 14 received with the data request.

8 Claims, 1 Drawing Sheet

(56) References Cited

U.S. PATENT DOCUMENTS

2006/0040726 A1* 2/2006 Szrek et al. ............... 463/17
2007/0011728 A1 1/2007 White
2007/0106897 A1 5/2007 Kulakowski
2007/0250704 A1 10/2007 Hallam-Baker
2008/0046114 A1* 2/2008 White et al. ............ 700/215
2009/0267729 A1* 10/2009 Rowe et al. ............. 340/5.8

* cited by examiner

PRODUCT SECURITY SYSTEM

BACKGROUND

1. Field

The present invention relates to a product security system, in which machine-readable items of information are applied to products. Data pertaining to the product are provided centrally in a database.

2. Related Art

Machine-readable items of information can for example be applied to products in the form of RFID labels or bar codes. It is known that a producer of the product equips a product with an RFIC label and provides data connected with the product in a database of a third party. For example a yogurt container with a certain expiration date can store a product ID in the RFID label. Allocated to the product ID, the expiration date is stored in the central database. The end customer can read out the RFID label with his RFID capable mobile phone, send the read product ID to the database and receives reliable information about the expiration date of the product as a response.

It is also known to use such a system for providing sensitive or confidential information which is to be accessible only for certain addressees. For example in the database there can be stored confidential delivery information which is allocated to the product ID and which may be retrieved from the database exclusively by authorized instances, for example the recipient of the delivery.

SUMMARY OF THE DISCLOSURE

It is the object of the present invention to provide a system with improved data security.

This object is achieved with the subject matter of the independent claims. The independent claims are directed at preferred embodiments.

It is a basic idea of the present invention to provide a data-base provider with encrypted data which he can decrypt only with the aid of an item of information which is applied in a machine-readable fashion to a product allocated to the data set. In this way the database provider can decrypt and provide individual data sets from the plurality of data sets stored in the database only at the time when he receives the corresponding machine-readable information. The database provider cannot access the other contents of the database without the presence of the machine-readable information applied to the products. Since a misuse of the data by the database supplier is consequently limited, this service is better suited to be assigned to a third party.

In a preferred embodiment a decryption key is applied to the product in the form of machine-readable information.

In other embodiments a part of the encrypted data set allocated to the product is contained on the product in the form of machine-readable information. The encrypted data set—optionally including a decryption key—is divided into a main part and a remainder in a suitable fashion, so that the main part stored in the database cannot be decrypted without the remainder applied to the product.

DESCRIPTION OF THE DRAWINGS

The invention shall be described in the following with reference to preferred embodiment, in which there is shown in detail.

DETAILED DESCRIPTION OF PREFERRED EMBODIMENTS OF THE INVENTION

Figure 1:
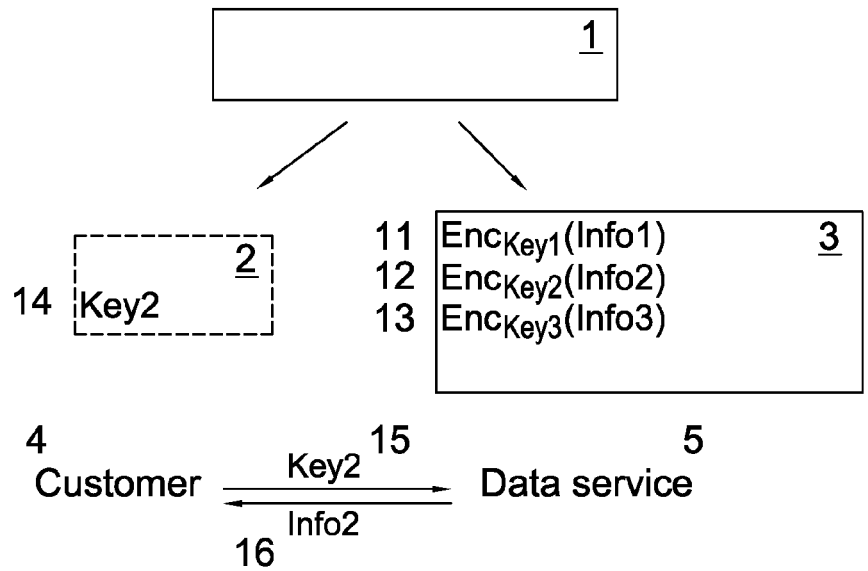
FIG. 1 a product information system with encrypted data sets, a data base and a decryption key on a product.

In FIG. 1 a product information system is schematically represented with a producer 1, a product 2, as well as a database 3 of a data service 5. The producer 1 produces his product 2.

The producer applies a decryption data set 14 on the product in a machine-readable fashion, for example by storing the information in an RFID label. For the product 2 the producer generates an encrypted item of product information 12 on the basis of confidential data. The encrypted product information 12 can take place through encrypting the confidential data with the key 14. The producer 1 gives the encrypted data set to a database provider of the database 3, preferably as one out of a plurality of encrypted data sets 11 to 13. The data sets 11 to 13 of the database 3 are encrypted individually. This means that with a decryption data set 14 preferably only one confidential data set 16 can be generated, however maximally a very small number of data sets in relation to the total amount of data in the data base.

A customer 4 reads out, for example with the aid of his mobile end device, the contents of the RFID label of the product 2 and consequently the decryption data set 14, and sends it as a data request 15 to a data service 5. The data service 5 uses the decryption data set 14 contained in the data request so as to yield the confidential data 16 from the encrypted data set 12. The decrypted confidential data 16 are sent by the data service 5 to the customer 4, for example via mobile telephony networks to his mobile telephone.

It should be noted that the steps of writing the machine-readable information onto the product and of generating the encrypted confidential data can be carried out selectively by one or two different trustworthy instances. For example a producer of RFID labels can assume the writing of the information onto the product, after a security service provider or the producer has encrypted the confidential data and provides the corresponding decryption data sets 14.

Figure 2:
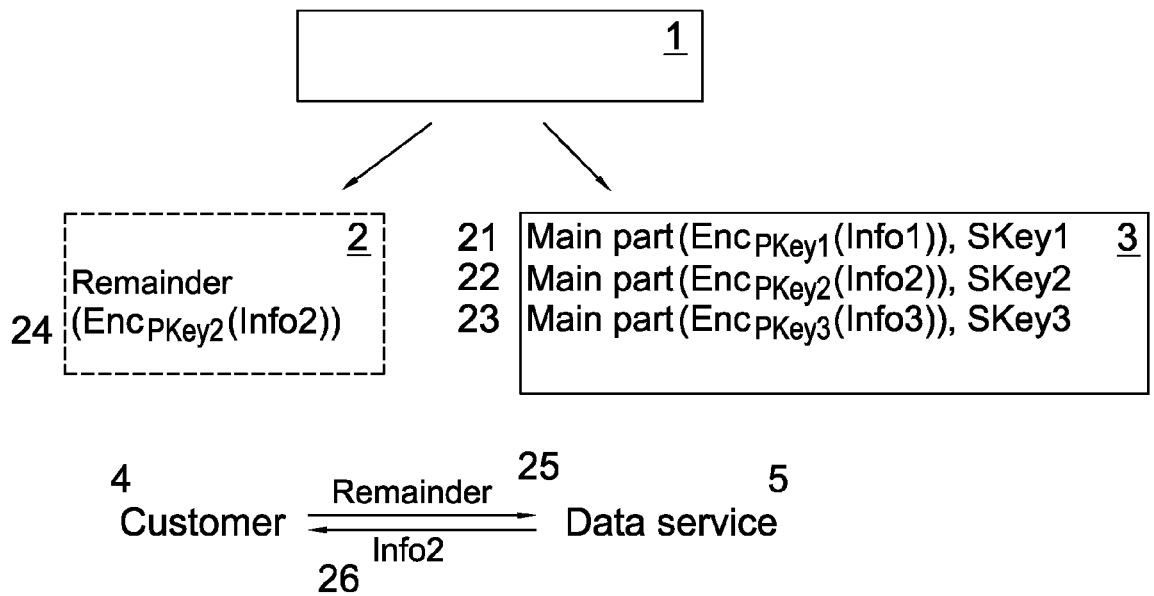
FIG. 2 a product information system with encrypted partial data sets in a database and remainder data sets on products.

FIG. 2 shows a variant of the system of FIG. 1 which is modified in regard of the division of the stored information.

In the product information system the producer 1 or a trustworthy further instance generates an encrypted data set Enc_PKey2(Info2) for the confidential data Info2. Enc_PKey2(Info2) here stands for the data Info2 which are encrypted with the public key PKey2 of the asymmetric pair of keys (PKey2, SKey2). The encrypted data set is divided into two parts—a main data set 22 (main part) and a remainder data set 24 (remainder). The main data set 22, which can optionally also contain the decryption key Skey1 to Skey3, thus here the secret key of the asymmetric pair of keys, is stored together with further similar data sets 21 to 23 for further products in the database 3. The remainder data set 24 is stored in the RFID label of the product 2. Correspondingly the customer 4 read out the remainder data set 24 from the product 2 and sends it as a data request 25 to the data service 5. Only with the aid of the composite data set can the confidential information for the product 2 be decrypted again. The decrypted confidential information is transmitted to the customer as response 26.

In the described systems the customer 4 is not necessarily an end customer of the product 2, but can be a distributor, a customs authority or a seller.

To prevent that in the system according to FIG. 2 decrypted data, for the given part, can be generated in the database with the aid of the main data set (MainPart(EncPkey2(Info2)) and the decryption key(SKey2), different approaches are conceivable. The used encryption algorithm therein can for example also be a symmetric algorithm, such as a 3-DES algorithm.

According to a first variant the remainder data set 24 can consist of respectively one first part of the sequentially, subsequently encrypted parts of the total data set. Consequently every individual encryption block is divided up and cannot be decrypted.

In a further variant a permutation of the encrypted data set can be carried out in such a fashion that after performing the permutation the first block respectively consists of the first bytes of the first eight blocks. If now as remainder data set there is used the first block with the corresponding parts of the other blocks as remainder data set, the individual data blocks again cannot be decrypted.

A further variant consists in changing the CBC mode of the DES or 3-DES algorithm in such a fashion that for decrypting the block N the plain text of the block N−1 must be present. In the case that the first block of the encrypted data set is missing, thus no further block can be decrypted any more. Such a chain-linking could e. g. be achieved in that the result of the encryption of block N is connected with the plain text of the block N−1, for example by an XOR operation. Thus the resulting final block of the encryption data set can only be decrypted provided that one has the block N−1 of the plain text beforehand. By removing the first block of the encrypted data set as remainder data set, the first block of the plain text cannot be generated however, and thus the rest of the blocks of the encrypted data set cannot be decrypted either.

What is claimed:

1. A method for obtaining data allocated to a product, the product including machine-readable items of information applied to the product, the method comprising the steps:
    reading, with a data requester device, the machine-readable information applied to the product;
    requesting data allocated to the product by sending the read machine-readable information to a data service device, the data service device being included in a product information system in which the data service device stores allocated data for a plurality of products in encrypted form;
    receiving the data request with the data service device;
    determining the requested data with the data service device;
    sending the requested data from the data service device to the data requester device;
    wherein the data service device cannot decrypt said allocated data without the contents of a data request,
    wherein, during the step of determining the requested data, the data allocated to the product are generated by decrypting the stored encrypted data using the machine-readable items of information received with the data request and a decryption key,
    wherein the decrypted data are sent as the request data in the step of sending,
    wherein the data allocated to the product are divided in encrypted form into N data blocks 1 to N of encrypted information, N being an integer greater than 1,
    wherein the data blocks 1 to N include a main data set of encrypted information, which is held ready by the data service device, and a remainder data set of encrypted information, which is applied to the product as the machine-readable information,
    wherein the remainder data set of encrypted information applied to the product as the machine-readable information includes at least one data block removed from N data blocks, and
    wherein the data service device obtains at least one removed data block from the product for decrypting the allocated data.

2. The method according to claim 1, wherein the machine-readable information contains decryption data which are used as a key for the decryption.

3. The method according to claim 1, wherein the machine-readable information contains a product ID.

4. The method according to claim 3, wherein, during the step of determining the requested data, the data service device determines with the aid of the product ID the data to be decrypted.

5. The method according to claim 3, wherein the product ID is formed by a common part of the encrypted product-related data, which is present both in the form of machine-readable information on the product and to the data service device.

6. A data service device configured to provide data allocated to products in response to data requests, the data service device comprising:
    a database in which, for a plurality of products, product allocated data are stored in encrypted form; and
    a processing unit equipped to receive and respond to data requests, said processing unit being equipped to generate, for a data request, the requested data by decrypting the stored encrypted data from the database using machine-readable items of information read from a product and received with the data request and a decryption key,
    wherein the data service device cannot decrypt said product-allocated data without the contents of the data request, and
    wherein the data allocated to the product are divided in encrypted form into N data blocks 1 to N of encrypted information, N being an integer greater than 1,
    wherein the data blocks 1 to N include a main data set of encrypted information, which is held ready by the data service device, and a remainder data set of encrypted information, which is applied to the product as the machine-readable information,
    wherein the remainder data set of encrypted information applied to the product as the machine-readable information includes at least one data block removed from N data blocks, and
    wherein the data service device obtains the at least one removed data block from the product for decrypting the allocated data.

7. A non-transitory product comprising machine-readable items of information which are provided in a manner so as to enable a central data service device of a product information system, the central data service device storing product related data for the product in encrypted form, data for the product being not decryptable with a decryption key without the machine-readable items of information, to generate the data related to the product by decrypting the stored encrypted data,
    wherein the data allocated to the product are divided in encrypted form into N data blocks 1 to N of encrypted information, N being an integer greater than 1,
    wherein the data blocks 1 to N include a main data set of encrypted information, which is held ready by the data service device, and a remainder data set of encrypted information, which is applied to the product as the machine-readable information, wherein the remainder data set of encrypted information applied to the product as the machine-readable information includes at least one data block removed from N data blocks, wherein the data service device obtains the at least one removed data block from the product for decrypting the allocated data.

8. A product information system comprising a data service device according to claim 6 and a plurality of products including machine-readable items of information.

* * * * *